(12) United States Patent
Kamata et al.

(10) Patent No.: US 9,310,914 B2
(45) Date of Patent: Apr. 12, 2016

(54) DRIVING DEVICE, ELECTRONIC DEVICE, AND DRIVE CONTROL PROGRAM

(71) Applicant: FUJITSU LIMITED, Kawasaki-shi, Kansgawa (JP)

(72) Inventors: Yuichi Kamata, Isehara (JP); Kiyoshi Taninaka, Ebina (JP); Yasuhiro Endo, Ebina (JP); Akihiko Yabuki, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/532,362

(22) Filed: Nov. 4, 2014

(65) Prior Publication Data
US 2015/0054769 A1 Feb. 26, 2015

Related U.S. Application Data

(63) Continuation of application No. PCT/JP2012/064952, filed on Jun. 11, 2012.

(51) Int. Cl.
*G06F 3/01* (2006.01)
*G06F 3/041* (2006.01)
*G06F 3/043* (2006.01)

(52) U.S. Cl.
CPC ............... *G06F 3/041* (2013.01); *G06F 3/016* (2013.01); *G06F 3/043* (2013.01)

(58) Field of Classification Search
None
See application file for complete search history.

(56) References Cited

U.S. PATENT DOCUMENTS

| | | | | |
|---|---|---|---|---|
| 2002/0149561 A1* | 10/2002 | Fukumoto et al. | ............. | 345/156 |
| 2006/0119573 A1 | 6/2006 | Grant | | |
| 2008/0198139 A1 | 8/2008 | Lacroix et al. | | |
| 2009/0243997 A1* | 10/2009 | Tierling et al. | ............... | 345/156 |
| 2010/0141606 A1* | 6/2010 | Bae et al. | ....................... | 345/174 |
| 2011/0260991 A1 | 10/2011 | Aono | | |
| 2011/0310043 A1 | 12/2011 | Lacroix et al. | | |
| 2012/0025742 A1* | 2/2012 | Masahiko | ...................... | 318/114 |
| 2012/0120008 A1* | 5/2012 | Mori | ............................. | 345/173 |
| 2012/0232780 A1* | 9/2012 | Delson et al. | .................. | 701/400 |

FOREIGN PATENT DOCUMENTS

| | | |
|---|---|---|
| JP | 2002-149312 A | 5/2002 |
| JP | 2005-149197 A1 | 6/2005 |
| JP | 2008-521597 A1 | 6/2008 |
| JP | 2010-519649 A | 6/2010 |
| JP | 2011-34150 A1 | 2/2011 |

(Continued)

OTHER PUBLICATIONS

International Search Report for International Application No. PCT/JP2012/064952 dated Aug. 7, 2012.

(Continued)

*Primary Examiner* — Antonio Xavier
(74) *Attorney, Agent, or Firm* — Kratz, Quintos & Hanson, LLP

(57) ABSTRACT

A driving device includes a storage unit configured to store waveform data of driving signals for stopping excitation of an actuator at a sinusoidal wave of a resonance frequency of the actuator, at portions other than a center point of an amplitude of the sinusoidal wave; and a processor programmed to execute a process including reading the waveform data stored in the storage unit and outputting, to the actuator, the driving signals corresponding to the waveform data that has been read.

5 Claims, 10 Drawing Sheets

(56) References Cited

FOREIGN PATENT DOCUMENTS

| | | |
|---|---|---|
| JP | 2011/60333 A1 | 3/2011 |
| JP | 2012-20284 A1 | 2/2012 |
| WO | WO 2006/071449 A1 | 7/2006 |
| WO | 2008/103535 A1 | 8/2008 |
| WO | WO 2010/103693 A1 | 9/2010 |

OTHER PUBLICATIONS

Office Action mailed on Oct. 6, 2015 issued with respect to the corresponding Japanese Patent Application No. 2014-520835; partial translation of office action.

* cited by examiner

LRA (VCM TYPE)
(linear resonant actuator)
(voice coil motor)

LRA (PIEZO TYPE)

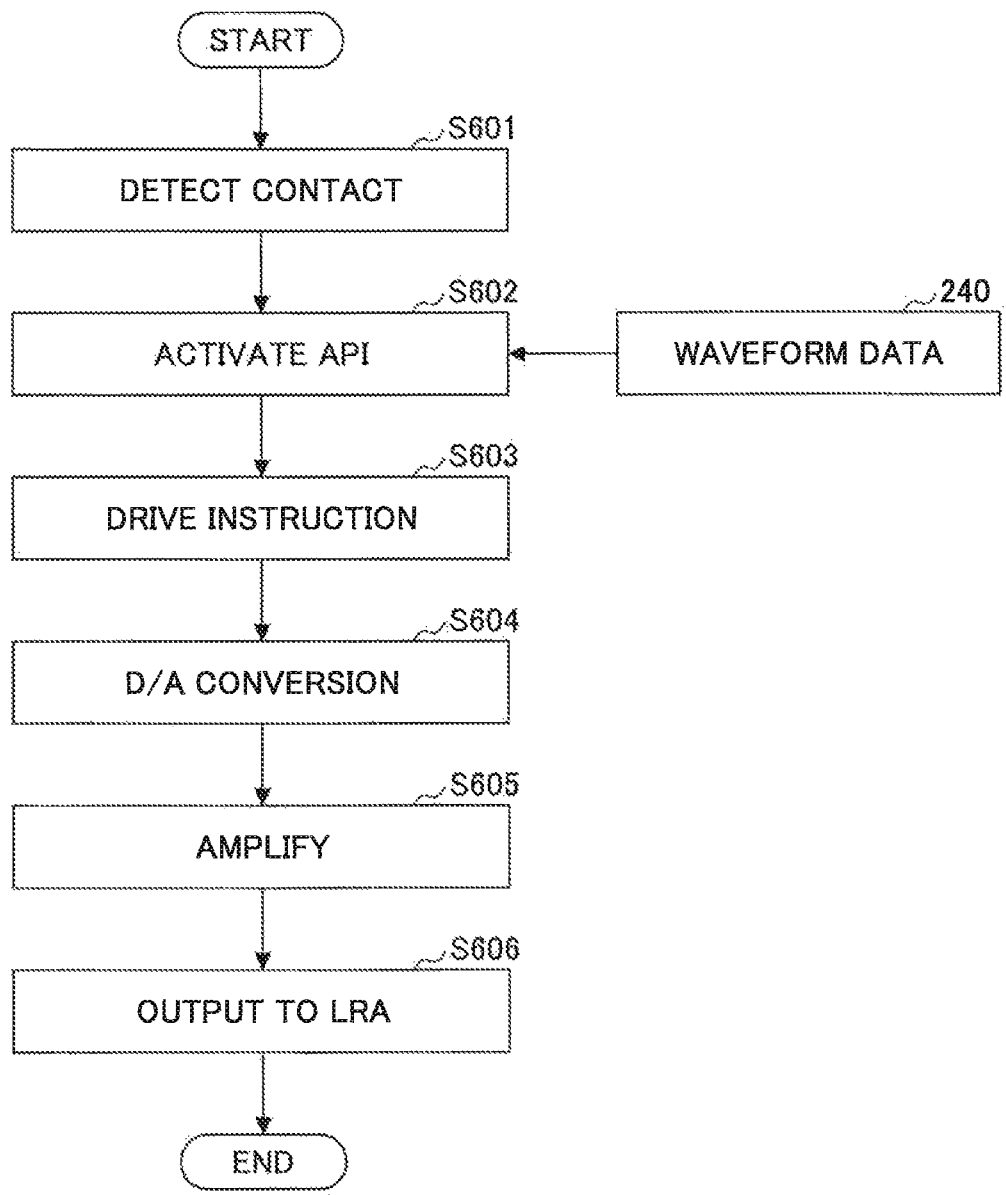

DRIVING DEVICE, ELECTRONIC DEVICE, AND DRIVE CONTROL PROGRAM

CROSS-REFERENCE TO RELATED APPLICATION

This application is a U.S. continuation application filed under 35 USC 111 (a) claiming benefit under 35 USC 120 and 365 (c) of PCT Application PCT/JP2012/064952 filed on Jun. 11, 2012, the entire contents of which are incorporated herein by reference.

FIELD

The embodiments discussed herein are related to a driving device, an electronic device, and a drive control program for driving an actuator.

BACKGROUND

Conventionally, there is an electronic device including a flat touch panel as an input unit The touch panel is for receiving a touch to the touch panel as an input operation, and no considerations have been made for providing a tactile sensation in accordance with the operation. Therefore, in a conventional touch panel, there has been demand for installing a device for expressing a tactile sensation in accordance with an operation.

Thus, in recent years, for example, considerations have been made to provide a tactile sensation in accordance with an operation by using the vibration caused by a LRA (Linear Resonant Actuator). Furthermore, as the driving method of a LRA, there is an example described in Patent Document 1, and an exclusive-use IC (Integrated Circuit) for controlling a tactile presentation device.

Patent Document 1: Japanese Laid-Open Patent Publication No. 2012-20284

However, in the case of a vibration using LRA, the vibration does not immediately stop when the input is stopped. Therefore, for example, it is difficult to express a precipitous tactile sensation caused by an operation of pressing a button of a metal dame type. Furthermore, Patent Document 1 describes a vibration suppressing unit for performing antiphase input after the input of the LRA is stopped; however, the suppression effects have been insufficient. Therefore, by the conventional technology, it has been difficult to appropriately express the differences in tactile sensations in accordance with different types of operations.

SUMMARY

According to an aspect of the embodiments, a driving device includes a storage unit configured to store waveform data of driving signals for stopping excitation of an actuator at a sinusoidal wave of a resonance frequency of the actuator, at portions other than a center point of an amplitude of the sinusoidal wave; and a processor programmed to execute a process including reading the waveform data stored in the storage unit and outputting, to the actuator, the driving signals corresponding to the waveform data that has been read.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 6 is a flowchart illustrating the driving of the LRA performed by the driving device according to an embodiment.

DESCRIPTION OF EMBODIMENTS

An overview of the present embodiment is described below with reference to FIGS. 1A and 1B.

Figure 1A:
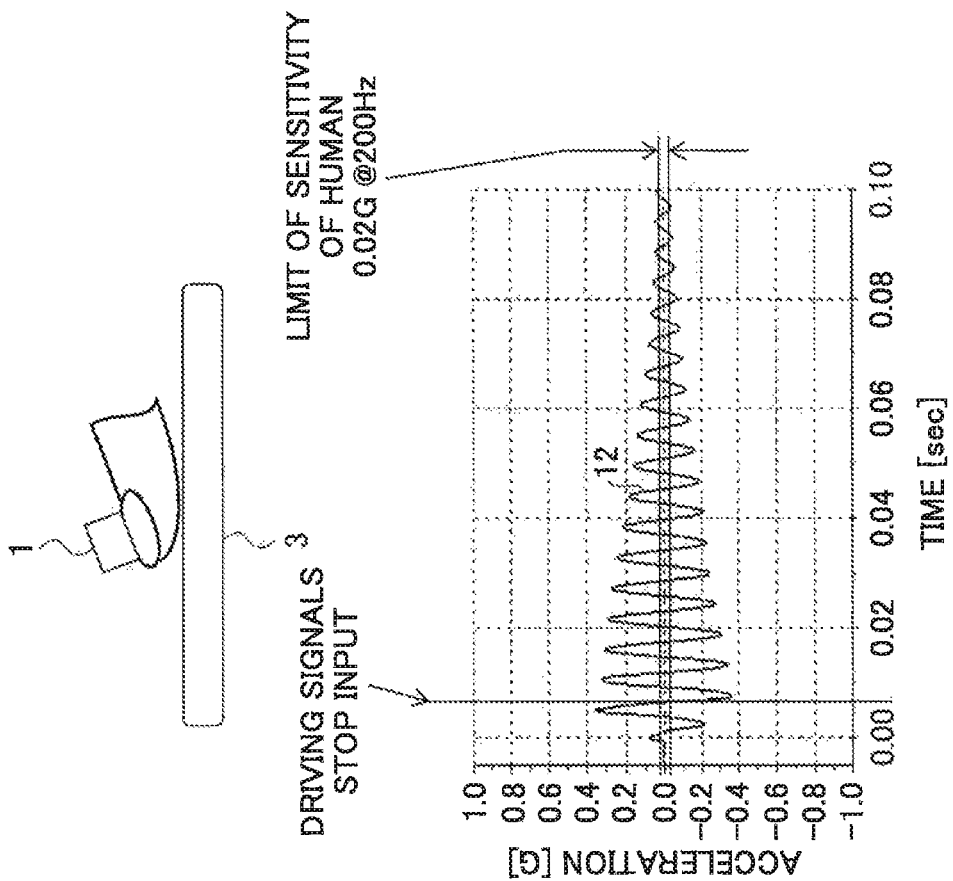
FIGS. 1A and 1B illustrate an overview of an embodiment.
Figure 1B:
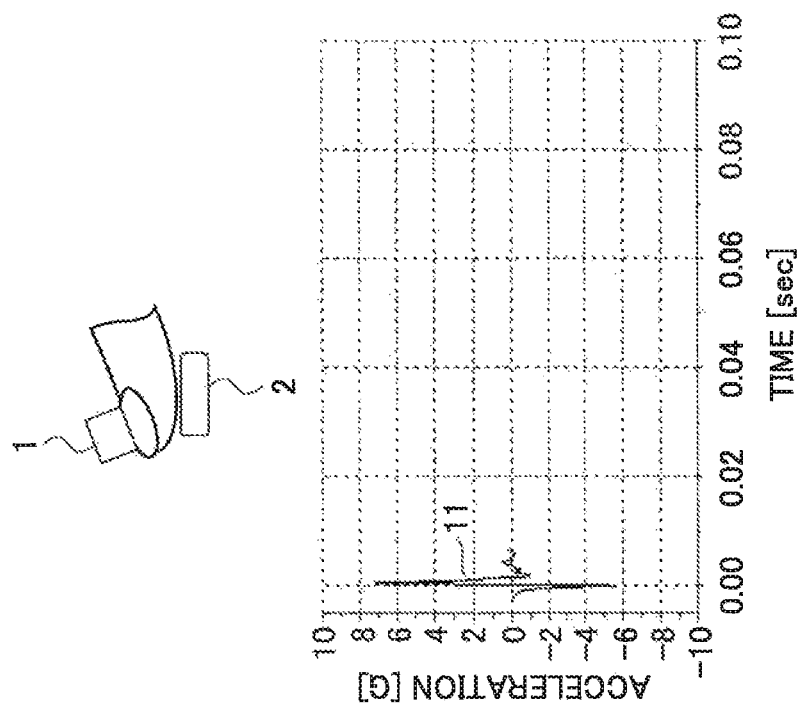

FIGS. 1A and 1B illustrate an overview of the present embedment.

FIG. 1A illustrates a waveform 11 of acceleration of a vibration that is generated when a button 2 is pressed by a human being's finger to which an acceleration meter 1 is attached. FIG. 1B illustrates a waveform 12 of acceleration of a vibration that is generated when a touch panel 3 to which a LRA (Linear Resonant Actuator) is attached, is touched by a human being's finger to which an acceleration meter 1 is attached. In the example of FIG. 1A, the button 2 is, for example, a button of a metal dome type. Furthermore, the button 2 and the touch panel 3 are provided in an electronic device.

The vibration indicated by the waveform 11 rapidly attenuates in one through several cycles. Meanwhile, the vibration indicated by the waveform 12 continues until the free vibration according to the natural vibration frequency of LRA attenuates, even after the supply of driving signals is stopped.

Figure 2:
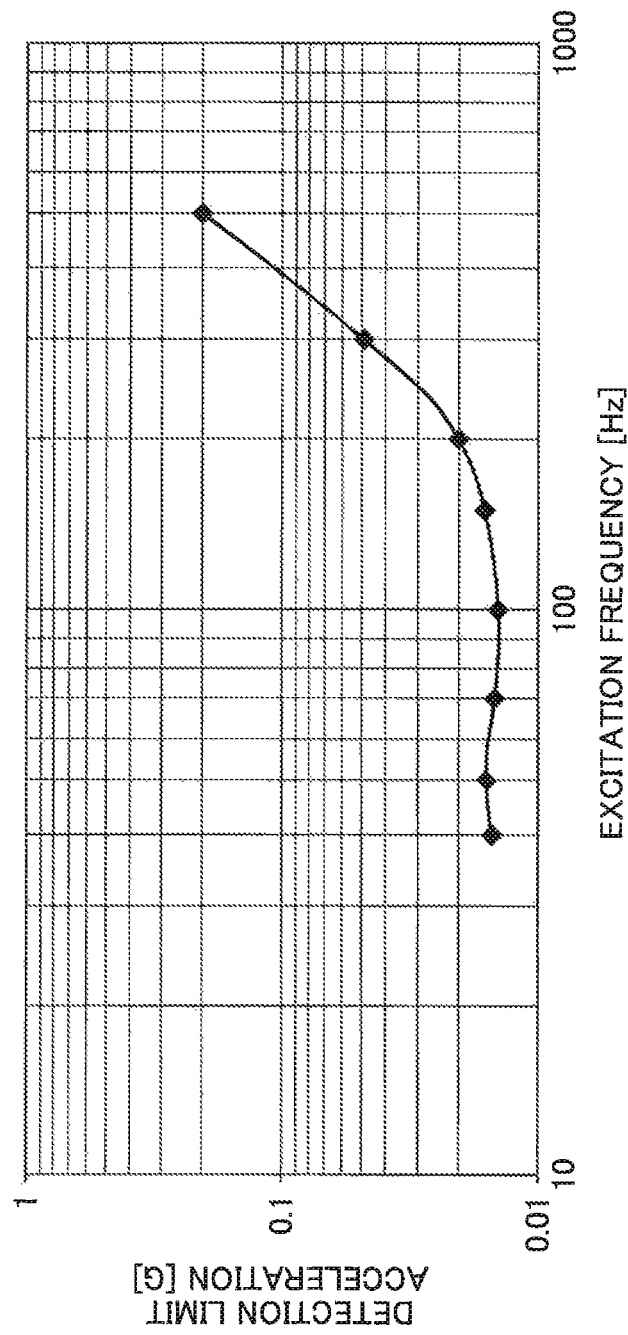
FIG. 2 illustrates the sensitivity of a human's organ for feeling acceleration.

Incidentally, the human fingertip becomes incapable of feeling a vibration, when the acceleration of the vibration becomes less than or equal to 0.02 G in a vibration frequency 200 Hz. The vibration frequency is the number of vibrations per second. The acceleration of the vibration indicates the amount of change in velocity of the vibration per unit time. FIG. 2 illustrates the sensitivity of a human's organ for feeling acceleration. Note that the human's organ for feeling acceleration is the Pacinian corpuscle. The Pacinian corpuscle is one of the four major types of mechanoreceptor mainly found in the skin.

That is to say, with respect to the waveform 11, the finger stops feeling the vibration within 0.01 seconds because the acceleration of vibration becomes less than or equal to 0.02 G. Meanwhile, with respect to the waveform 12, it takes 0.1 second for the acceleration of vibration to become less than or equal to 0.02 G, and therefore the finger continues to feel the vibration. until 0.1 second passes. Therefore, the human feels completely different tactile sensations in the case of the vibration indicated by the waveform 11 and in the case of the vibration indicated by the waveform 12.

Thus, in the present embodiment, the pattern of the vibration of LRA has been devised to express a clicking feeling when the button 2 is pressed.

Figure 3:
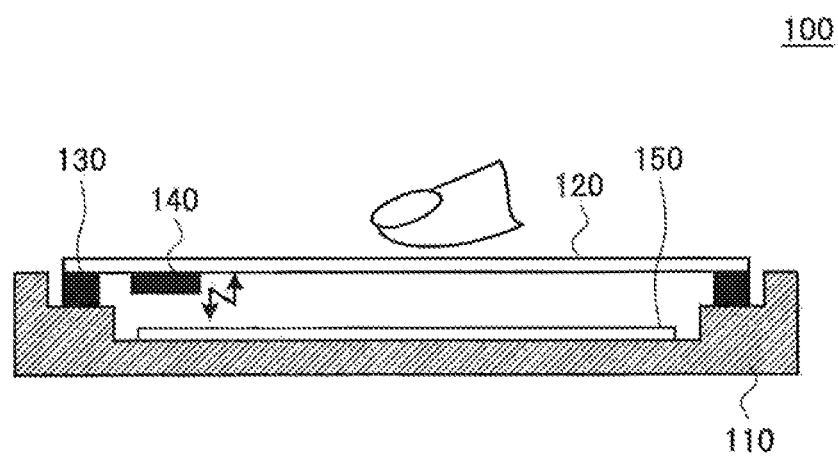
FIG. 3 illustrates an electronic device according to an embodiment.

In the following, a description is given of an electronic device according to the present embodiment with reference to FIG. 3. FIG. 3 illustrates an electronic device according to the present embodiment.

The electronic device according to the present embodiment may be any device having a touch panel including, for example, a display function and an input function, as an input unit. For example, the electronic device according to the present embodiment may be a smartphone, a tablet type computer, or a mobile information terminal.

An electronic device 100 according to the present embodiment includes a case 110, a touch panel 120, a double-sided tape 130, a LRA 140, and a substrate 150.

In the electronic device 100 according to the present embodiment, the touch panel 120 is fixed to the case 110 by the double-sided tape 130. The LRA 140 is attached to the surface of the touch panel 120 on the side of the case 110. The LRA 140 is formed by combining a vibration system having a resonance frequency designed in advance and an actuator. The LRA 140 is a vibration device for generating a vibration mainly by driving the actuator with the resonance frequency, in which the intensity of vibration changes according to the amplitude of the driving waveform. Note that in the present embodiment, the LRA 140 is the vibration device; however, the vibration device is not limited to a LRA as long as the vibration device has a structure including a resonator and an actuator to be subjected to excitation.

The substrate 150 is arranged inside the case 110. On the substrate 150, a driving device for controlling the driving of the LRA 140 and a driver IC for outputting driving signals to the LRA 140, are mounted.

When the user's finger contacts the touch panel 120, the electronic device 100 according to the present embodiment detects this contact and drives the LRA 140 by the driving device mounted on the substrate 150 and propagates the vibration of the LRA 140 to the touch panel 120.

Note that the electronic device 100 according to the present embodiment may be any device including the touch panel 120 as an input operation unit, and may therefore be a device such as an ATM (Automatic Teller Machine) that is installed and used at a particular location.

Figure 4A:
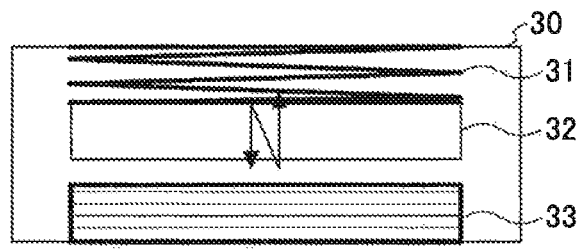
FIGS. 4A and 4B illustrate examples of LRAs.
Figure 4B:
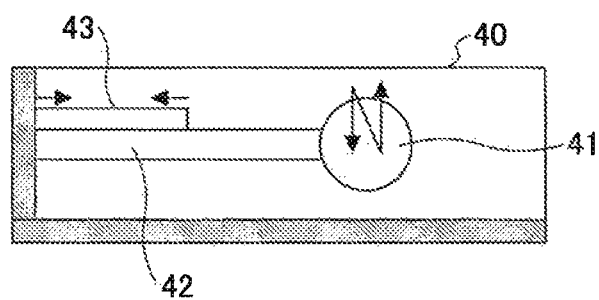

In the following, a description is given of the LRA 140 with reference to FIGS. 4A and 4B. FIGS. 4A and 4B illustrate examples of LRAs. FIG. 4A illustrates an example of a LRA using a voice coil, and FIG. 4B illustrates an example of a LRA using a piezoelectric element.

A LRA 30 illustrated in FIG. 4A includes a spring 31, a magnet 32, and a coil 33. With respect to the LRA 30, the natural vibration frequency f0 is indicated by the following formula 1, where the spring constant of the spring 31 is k, and the mass of the magnet 32 is m.

$$f_0 \approx \frac{1}{2\pi}\sqrt{\frac{k}{m}} \quad \text{Formula 1}$$

A LRA 40 illustrated in FIG. 4B includes a weight 41, a beam 42, and a piezoelectric element 43. With respect to the LRA 40, a natural vibration frequency f0 is indicated by the following formula 2, where the mass of the weight 41 is m, the Young's modulus of the beam 42 is E, the cross-sectional second moment of the beam 42 is I, and the length in the longitudinal direction of the beam 42 is L.

$$f_0 \approx \frac{1}{2\pi}\sqrt{\frac{3EI}{mL^3}} \quad \text{Formula 2}$$

As the LRA 140 according to the present embodiment, the LRA 30 using a voice coil may be applied, or the LRA 40 using the piezoelectric element 43 may be applied.

Figure 5:
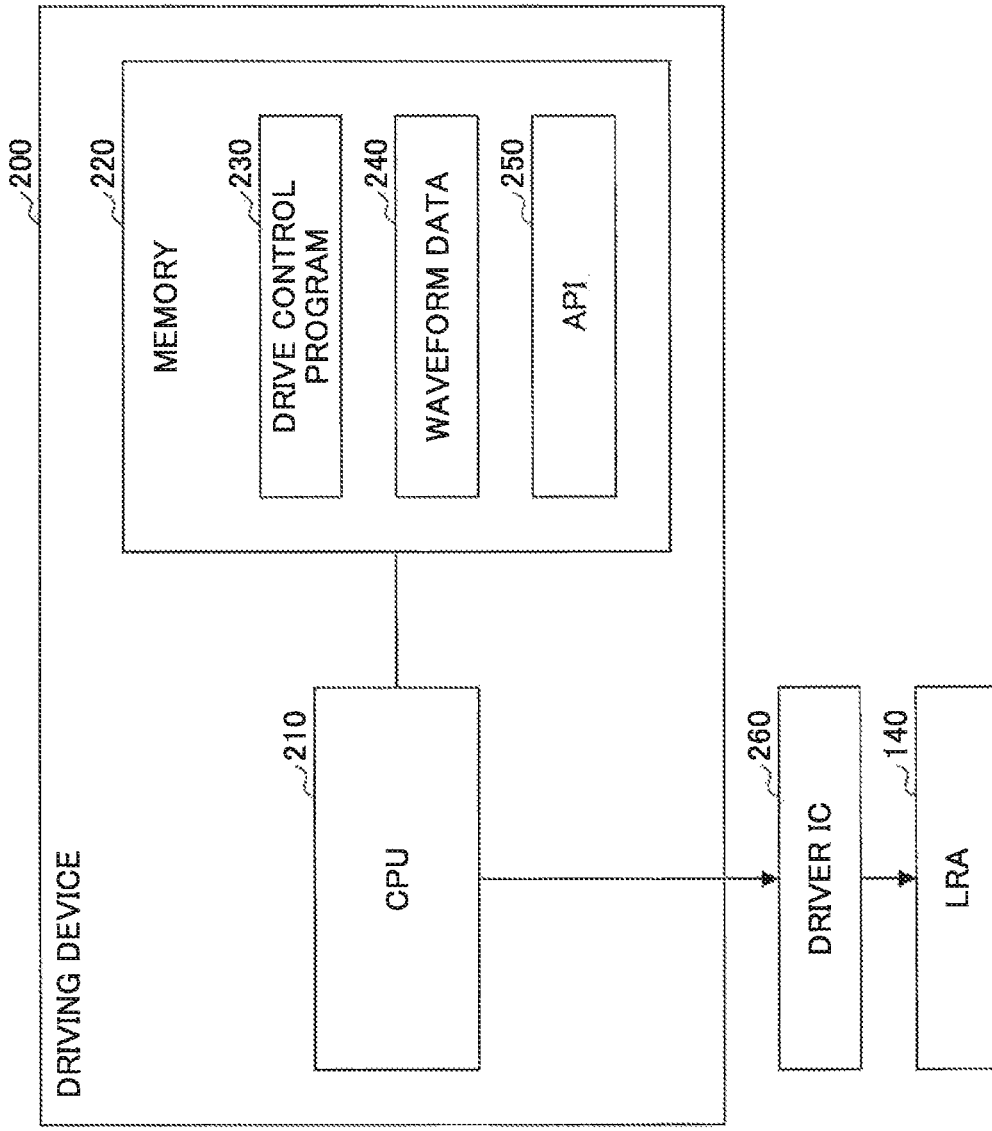
FIG. 5 illustrates a driving device according to an embodiment.

Next, with reference to FIG. 5, a description is given of the driving device mounted on the substrate 150 included in the electronic device 100 according to the present embodiment. FIG. 5 illustrates the driving device according to the present embodiment.

A driving device 200 according to the present embodiment includes a CPU (Central Processing Unit) 210 and a memory 220. The CPU 210 performs a process of driving the LRA 140 described below, by reading and executing a drive control program 230 stored in the memory 220. The memory 220 is provided with a storage area storing the drive control program 230 for controlling the driving of the LRA 140, a storage area storing waveform data 240, and a storage area storing an API (Application Programming Interface) 250 for providing a tactile sensation.

The drive control program 230 causes the CPU 210 to execute drive control of the LRA 140. The waveform data 240 is data expressing the waveform of driving signals that are generated in advance for expressing a clicking feeling by a vibration generated by the LRA 140. Details of the waveform data 240 are described below. The API 250 is activated by the drive control program 230, and performs various processes for providing a tactile sensation. In FIG. 5, the API 250 is stored in the memory 220; however, the API 250 may be stored in another memory mounted on the substrate 150.

FIG. 6 is a flowchart illustrating the driving of the LRA 140 performed by the driving device 200 according to the present embodiment.

When the driving device 200 according to the present embodiment detects a contact made with the touch panel 120 (step S601), the driving device 200 activates the API 250 (step S602). Specifically, for example, the driving device 200 may activate the API 250 when a contact is made with a button displayed on the touch panel 120.

The API 250 reads the waveform data 240 stored in the memory 220, and outputs a drive instruction corresponding to the waveform data 240, to a driver IC 260 (step S603). The driver IC 260 receives the drive instruction and performs D/A (Digital to Analog) conversion on the waveform data 240 (step S604), and amplifies the waveform data 240 by an amplifier (step S605). The driver IC 260 outputs the amplified signals to the IRA 140 (step S606).

In the following, a description is given of the waveform data 240 according to the present embodiment.

In the present embodiment, attention is focused on the fact that the touch panel 120 itself fixed to the case 110 is also a vibration device that vibrates at a high frequency. In the present embodiment, the driving signals of the LRA 140 are signals for stopping the excitation on the LRA 140 at the time point of the peak of the amplitude, and the high frequency vibration of the touch panel 120 itself is excited. Accordingly, a vibration that rapidly attenuates in one through several cycles is generated, to express a clicking feeling.

Figure 7A:
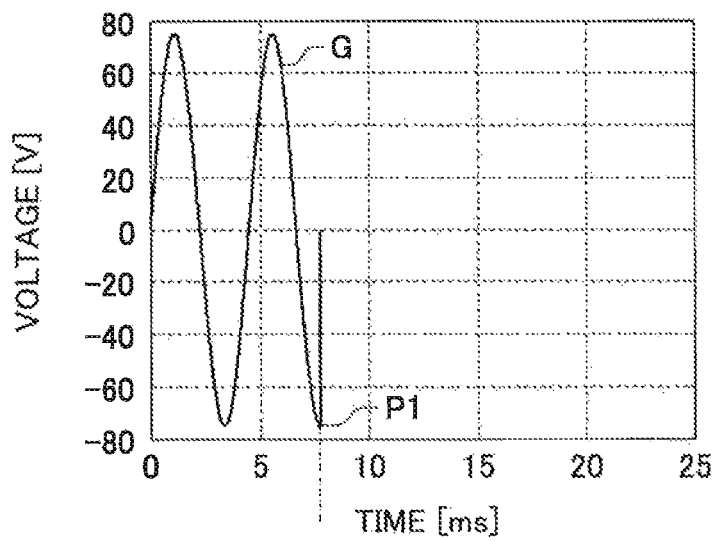
FIGS. 7A. and 7B illustrate the excitation of the vibration according to the resonance frequency of a touch panel.
Figure 7B:
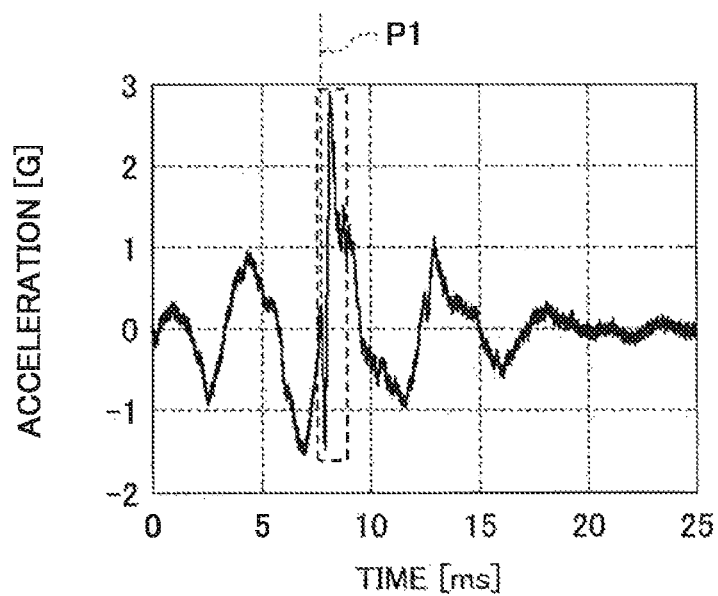

FIGS. 7A and 7B illustrate the excitation of the vibration according to the resonance frequency of the touch panel 120.

FIG. 7A illustrates an example of driving signals of the LRA 140 according to the present embodiment. The driving signal G illustrated in FIG. 7A is a signal of a voltage, and the waveform of the driving signal G is a sinusoidal waveform of the resonance frequency of the LRA 140. In the example of FIG. 7A, the resonance frequency of the LRA 140 is 225 Hz.

The driving signal G according to the present embodiment stops exciting the LRA 140 at point P1 of the peak of the amplitude. The amplitude of the driving signal G becomes zero, immediately after the excitation is stopped. As described above, in the present embodiment, by providing a point of discontinuity in the driving signal G where the value largely changes, the vibration of the LRA 140 is removed from the harmonic vibration at this point of discontinuity.

Furthermore, in the example of FIG. 7A, the driving time of the LRA 140 by the driving signal G is set to be a cycle of 7/4, such that the point P1 of the peak of the amplitude becomes the end of the driving signals G. The end of the driving signals G is the point where the excitation on the LRA 140 is stopped. In the present embodiment, the cycle of the driving signals G is 7/4; however, the present embodiment is not so limited.

In the present embodiment, for example, the cycle of the driving signals C may be set such that the driving time of the LRA 140 by the driving signals G is less than or equal to 10 ms. In the present embodiment, the shorter the cycle of the driving signals G, the shorter the time during which the finger continues to perceive the vibration, and therefore it is possible to express a tactile stimulation of a short time that is close to a clicking feeling. Note that in this case, in the present embodiment, the intensity of the perception is reduced, and therefore there is a need for securing a driving time by which a sufficient level of intensity is felt by the presented tactile sensation.

In step S603 of FIG. 6, the driving device 200 according to the present embodiment reads the waveform data 240 indicating the driving signals G by the API 250, and outputs a driving instruction corresponding to the waveform data 240 to the driver IC 260. The driver IC 260 performs D/A conversion on the waveform data 240 and amplifies the waveform data 240, and outputs the waveform data 240 to the LRA 140.

For example, the waveform data 240 according to the present embodiment may include the frequency, the amplitude, the phase, and the driving time (cycle) of the driving signals G. Furthermore, the waveform data 240 may be a formula expressing the waveform of the driving signals G.

In the following, a description is given. of a case where the driving signals C are applied to the LRA 140 in the driving device 200 driving device 200.

FIG. 7B illustrates a waveform of the acceleration of the vibration of the touch panel 120 in a case where driving signals are applied to the LRA 140 according to the present embodiment. FIG. 7B illustrates the acceleration of the vibration of the touch panel 120, when the resonance frequency of the touch panel 120 is 1 kHz and the driving signals G having a resonance frequency of 225 Hz is applied to the LRA 140.

In the present embodiment, the LRA 140 vibrates at a resonance frequency of 225 Hz. Furthermore, the touch panel 120 is vibrated at a resonance frequency of 1 kHz. That is to say, the vibration of the LRA 140 is a low frequency vibration, and the vibration of the touch panel 120 is a high frequency vibration. Note that the resonance frequency of the touch panel 120 is the resonance frequency in the state where the four sides of the touch panel 120 are fixed to the case 110.

The high frequency vibration of the touch panel 120 is not excited in the case where the LRA 140 is vibrated at a low frequency of a resonance frequency of 225 Hz. In this state, the driving device 200 excites the high frequency vibration of the touch panel 120, by removing the vibration of the LRA 140 from the harmonic vibration and applying a rapid force to the touch panel 120.

As a result, as illustrated in FIG. 7B, in the driving device 200, at point P1, a high frequency vibration having a frequency of 1 kHz is excited, and a vibration that rapidly attenuates in one through several cycles is generated. Furthermore, in the example of FIG. 7B, by exciting a high frequency vibration at point P1, the timings of the maximum value of the acceleration in the low frequency vibration and the maximum value of the acceleration in the high frequency vibration are matched and superposed, and therefore a precipitous peak having a high intensity is generated within a short period of time.

As described above, in the present embodiment, by generating a precipitous peak within a short period of time in the acceleration of the vibration, it is possible to provide an acute tactile sensation and to express a clicking feeling.

Note that the acceleration of the vibration of the touch panel 120 according to the present embodiment is detected with an acceleration sensor (not illustrated) arranged at the center of the touch panel 120.

Figure 8:
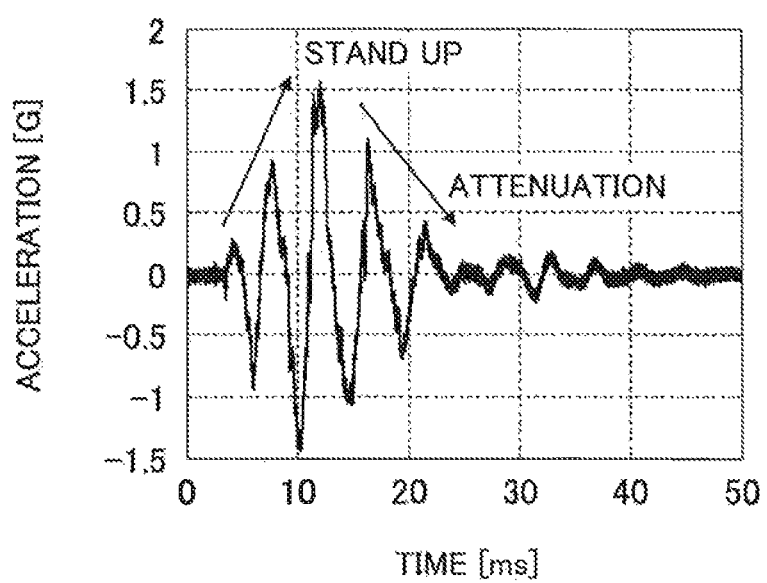
FIG. 8 illustrates the acceleration of the vibration of the touch panel when the voltage of the resonance frequency of the LRA is used as driving signals.

In the following, the effects of the present embodiment are described with reference to FIG. 8. FIG. 8 illustrates the acceleration of the vibration of the touch panel when the voltage of the resonance frequency of the LRA is used as the driving signals. The example of FIG. 8 illustrates the acceleration of the vibration of the touch panel 120, when an attempt is made to express a clicking feeling by reducing the driving time of the LRA 140.

However, even if the driving time of the LRA 140 is reduced, the vibration of the touch panel 120 continues for several cycles, because the stand-up time for amplifying the vibration and the time until the acceleration of the amplified vibration attenuates to less than or equal to 0.02 G, are needed. In the example of FIG. 8, it takes approximately 25 ms from the stand-up to the attenuation, and the vibration. continues for approximately four cycles. Therefore, it is difficult to provide an acute tactile sensation like a clicking feeling.

Conversely, in FIG. 7B, a vibration having a frequency of 1 kHz is rapidly standing up, and the vibration attenuates within approximately two cycles Thus, in the present embodiment, it is possible to express a clicking feeling by generating a precipitous tactile sensation within a short period of time in the acceleration of the vibration.

Furthermore, in the examples of FIGS. 7A and 7B, the excitation is stopped at the point of the peak of the amplitude of the driving signals G; however, the point of stopping the excitation is not so limited. In the present embodiment, for example, the timing of the peak of the acceleration in the low frequency vibration and the timing of the peak of the acceleration in the high frequency vibration are matched, and therefore the end of the driving signals may be shifted from the point P1.

In the examples of FIGS. 7A and 7B, the peak of the amplitude of the acceleration of the high frequency vibration as generated so as to substantially overlap the peak of the amplitude of the acceleration of the low frequency vibration.

In the examples of FIGS. 7A and 7B, the low frequency vibration is a resonance frequency, and therefore with respect to the waveform of the driving signals G in FIG. 7A, a phase difference of $\pi/2$ is generated in the waveform of acceleration in FIG. 7B, and therefore the acceleration of vibration becomes zero at the point P1 of the peak of the amplitude in the driving signals G. In the present embodiment, a high frequency vibration is excited at the point P1 that is the end of the driving signals G, and the acceleration of the high frequency vibration reaches a peak. Therefore, the timing when the acceleration of the high frequency vibration reaches a peak is slightly shifted from the timing of point P1 of the driving signals.

Specifically, for example, the peak of the acceleration of the low frequency vibration is supposed to reach a peak at ¼ cycle from the point P1 that is the end of the driving signals G; and when this is converted into time, the acceleration of the low frequency vibration reaches a peak (maximum value) at. approximately 1.11 ms later. Meanwhile, the high frequency vibration stands up from zero at the point P1 that is the end of the driving signals G, and is supposed to reach a peak of the acceleration in the same direction as that of the low frequency vibration at ¾ cycle. When this is converted into time, the acceleration of the high frequency vibration reaches a peak (maximum value) at 0.75 ms later. Thus, the peaks of the high and low frequency vibrations occur at a time difference of 0.36 ms. Furthermore, assuming that the peak of the acceleration of the low frequency vibration is 100%, the peak of the acceleration of the high frequency vibration overlaps a position of an intensity of approximately 87% with respect to the peak of the acceleration of the low frequency vibration.

Thus, in the present embodiment, assuming that the driving time of the LRA 140 by the driving signals G is 7/4 cycle+ 0.36 ms, and the peak of the amplitude of the driving signals G is 100%, the point where the amplitude of the driving signals G is 87% may be set as the end of the driving signals G. By shifting the point P1 to be the end of the driving signals G, it is possible to shift the timing at which the high frequency vibration is excited, and the peak of the acceleration of the low frequency vibration and the peak of the acceleration of the high frequency vibration may be superposed.

Figure 9A:
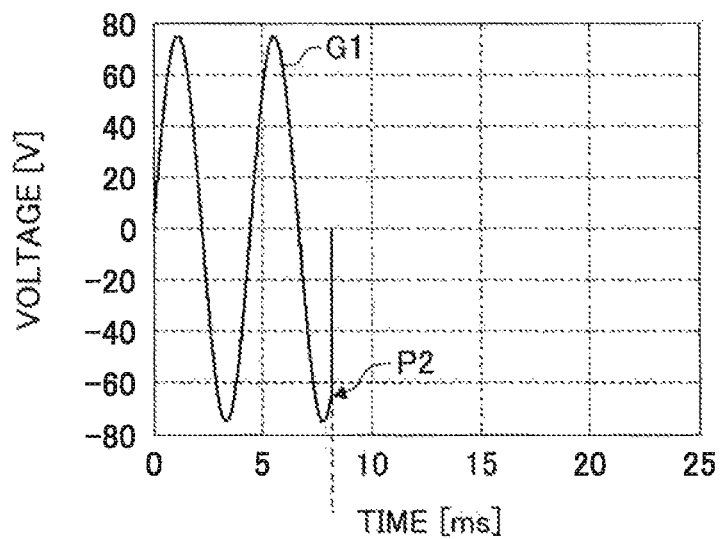
FIGS. 9A and 9B illustrate examples where the point of exciting the high frequency vibration is shifted.
Figure 9B:
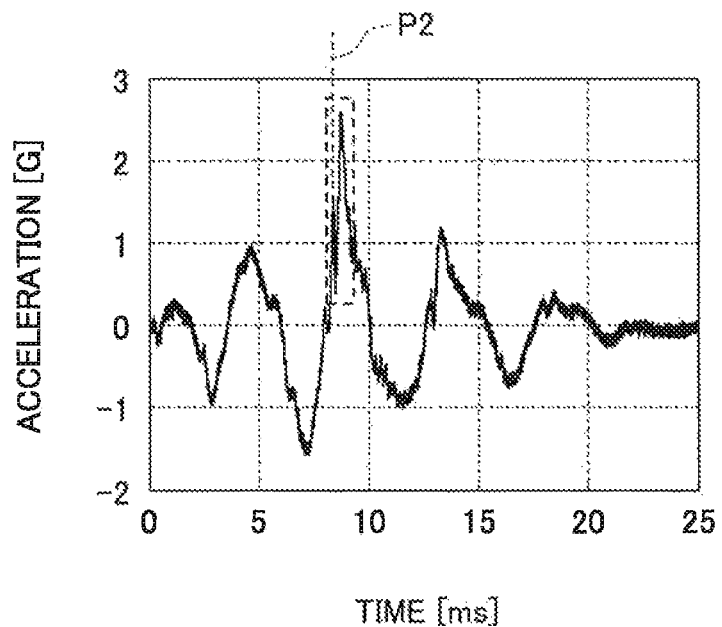

FIGS. 9A and 9B illustrates examples where the point of exciting the high frequency vibration is shifted. FIG. 9A illustrates a sinusoidal waveform of driving signals applied to the LRA 140, and FIG. 9B illustrates a waveform of the acceleration of the vibration of the touch panel 120 when driving signals are applied to the IRA 140 according to the present embodiment.

In FIG. 9A, in the driving signals G1, a point P2 that is slightly shifted from the peak of the amplitude is the end. In FIG. 9B, the end P2 of the driving signals G1 is shifted from the peak of the amplitude, and therefore the peak of the acceleration of the high frequency vibration is lower than the value indicated in FIG. 7B, but the same effects as those of FIGS. 7A and 7B are achieved.

That is to say, for example, the end of the driving signals in the present embodiment may be any point were it is possible to generate a precipitous peak for expressing a clicking feeling, in the waveform expressing the acceleration of the vibration of the touch panel 120. Specifically, the end of the driving signals may be any point where the value of the driving signal and zero become discontinuous. That is to say, the end of the driving signals may be any point other than zero that is the center point of the amplitude. Note that the end of the driving signals is preferably a point that is as close to the peak of the amplitude as possible, because it is possible to generate a precipitous peak within a short period of time in the waveform of the acceleration of the vibration of the touch panel 120.

Furthermore, in the present embodiment, for example, after stopping the excitation on the LRA 140 by the driving signals G, a brake waveform for suppressing a residual vibration of the LRA 140 may be applied on the LRA 140. A brake signal is, for example, signals of an antiphase of the vibration generated in the LRA 140. In the present embodiment, by using the brake signals after stopping the excitation on the LRA 140 by the driving signals G, it is possible to reduce the residual vibration, and the acceleration of the vibration of the touch panel 120 may be a waveform that rapidly attenuates within a short period of time.

Furthermore, in the electronic device 100 according to the present embodiment, the LRA 140 is attached to the surface of the touch panel 120 on the side of the case; however, the present embodiment is not so limited. For example, the IRA 140 may be arranged near the substrate 150 arranged inside the case 110.

Figure 10:
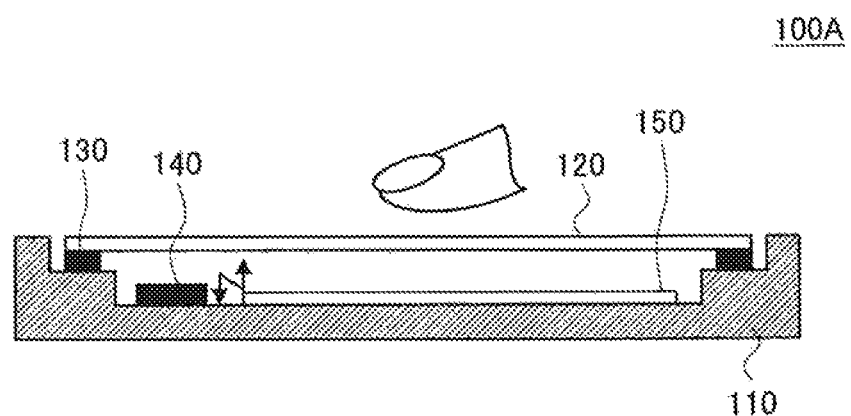
FIG. 10 illustrates an example of an electronic device in which the LRA is provided in the case.

FIG. 10 illustrates an example of an electronic device 100A in which the LRA 140 is provided in the case. In the electronic device 100A illustrated in FIG. 10, the IRA 140 is arranged near the substrate 150 provided inside the case 110.

When the LRA 140 is inside the case 110 as illustrated in FIG. 10, the electronic device 100A is preferably designed such that the resonance frequency of the touch panel 120 is 1 kHz at the time when the assembly of the electronic device 100A is completed.

The present embodiment is also applicable to the electronic device 100A. Furthermore, when the present embodiment is applied to the electronic device 100A, it is possible to express a clicking feeling when the button 2 of the metal dome type is pressed, similar to the case of the electronic device 100 according to the present embodiment.

According to an aspect of the embodiments, a tactile sensation in accordance with an operation is provided.

The driving device, the electronic device, and the drive control program are not limited to the specific embodiments described herein, and variations and modifications may be made without departing from the scope of the present invention.

All examples and conditional language recited herein ate intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A driving device comprising:
   a storage unit configured to store waveform data of a waveform of a driving signal for stopping excitation of an actuator, wherein the waveform of the driving signal is a sinusoidal waveform of a resonance frequency of the actuator, the sinusoidal waveform ending at a portion other than a center point of an amplitude of the sinusoidal waveform; and
   a processor programmed to execute a process including reading the waveform data stored in the storage unit and outputting, to the actuator, the driving signal corresponding to the waveform data that has been read,
   wherein the sinusoidal waveform ends at a peak or a point close to the peak of the amplitude of the sinusoidal waveform.

2. The driving device according to claim 1, wherein the driving signal stops the excitation of the actuator when the amplitude is at the peak.

3. An electronic device comprising:
   a touch panel; and
   a driving device including
      a storage unit configured to store waveform data of a waveform of a driving signal for stopping excitation of an actuator for vibrating the touch panel, wherein the waveform of the driving signal is a sinusoidal waveform of a resonance frequency of the actuator, the sinusoidal waveform ending at a portion other than a center point of an amplitude of the sinusoidal waveform, and a processor programmed to execute a process including reading the waveform data stored in the storage unit and outputting, to the actuator, the driving signal corresponding to the waveform data that has been read, wherein the sinusoidal waveform ends at a peak or a point close to the peak of the amplitude of the sinusoidal waveform.

4. A non-transitory computer-readable recording medium storing a drive control program that causes a computer to execute a process, the process comprising:

reading, from a storage unit, stored waveform data of a waveform of a driving signal for stopping excitation of an actuator, wherein the waveform of the driving signal is a sinusoidal waveform of a resonance frequency of the actuator, the sinusoidal waveform ending at a portion other than a center point of an amplitude of the sinusoidal waveform; and outputting, to the actuator, the driving signal corresponding to the waveform data that has been read, wherein the sinusoidal waveform ends at a peak or a point close to the peak of the amplitude of the sinusoidal waveform.

5. A drive control method executed by a computer, the method comprising:

reading, from a storage unit, stored waveform data of a waveform of a driving signal for stopping excitation of an actuator, wherein the waveform of the driving signal is a sinusoidal waveform of a resonance frequency of the actuator, the sinusoidal waveform ending at a portion other than a center point of an amplitude of the sinusoidal waveform; and outputting, to the actuator, the driving signal corresponding to the waveform data that has been read, wherein the sinusoidal waveform ends at a peak or a point close to the peak of the amplitude of the sinusoidal waveform.

* * * * *